United States Patent
Chen et al.

(10) Patent No.: US 9,066,201 B1
(45) Date of Patent: Jun. 23, 2015

(54) CORRELATING MEDIA TYPES OF EMERGENCY COMMUNICATION REQUESTS

(71) Applicant: Sprint Communications Company L.P., Overland Park, KS (US)

(72) Inventors: Bonnie Chen, Grapevine, TX (US); Gregory David Schumacher, Holliston, MA (US)

(73) Assignee: Sprint Communications Company L.P., Overland Park, KS (US)

( * ) Notice: Subject to any disclaimer, the term of this patent is extended or adjusted under 35 U.S.C. 154(b) by 261 days.

(21) Appl. No.: 13/683,073

(22) Filed: Nov. 21, 2012

(51) Int. Cl.
*H04W 4/02* (2009.01)
(52) U.S. Cl.
CPC ........................................ *H04W 4/02* (2013.01)
(58) Field of Classification Search
USPC ...................................................... 455/452.1
See application file for complete search history.

(56) References Cited

U.S. PATENT DOCUMENTS

| | | | |
|---|---|---|---|
| 7,991,381 B1 | 8/2011 | Dunne et al. | |
| 2008/0076382 A1 | 3/2008 | Girard et al. | |
| 2008/0081646 A1 | 4/2008 | Morin et al. | |
| 2008/0200143 A1* | 8/2008 | Qiu et al. | 455/404.2 |
| 2009/0291663 A1* | 11/2009 | Schultz et al. | 455/404.2 |
| 2010/0069099 A1 | 3/2010 | Dunn et al. | |
| 2010/0166154 A1 | 7/2010 | Peters | |
| 2010/0233991 A1 | 9/2010 | Crawford et al. | |
| 2010/0261448 A1 | 10/2010 | Peters | |
| 2011/0058658 A1 | 3/2011 | Li | |
| 2013/0143517 A1* | 6/2013 | Mitchell et al. | 455/404.2 |

* cited by examiner

*Primary Examiner* — Diane Mizrahi (57) ABSTRACT

Systems, methods, and software for correlating media types of emergency communication requests in wireless communication networks are provided herein. In one example, a method of operating a wireless communication system which routes communications between user devices and emergency service providers is provided. The method includes monitoring communication requests for emergency communication sessions between the user devices and service nodes of the emergency service providers to determine which media types of the communication requests are supported by the service nodes receiving the communication requests, identifying geographic locations of the user devices for the communication requests, identifying the service nodes receiving the communication requests, and creating a data structure correlating the geographic locations of the user devices and identifiers of the service nodes to the media types supported by the service nodes.

20 Claims, 6 Drawing Sheets

DATA STRUCTURE 500

| GEO LOC. | PSAP ID | MEDIA TYPE ACCEPTED |
|---|---|---|
| LOC. A | 131 | VOICE CALL |
| LOC. A | 131 | TEXT MESSAGE |
| LOC. A | 131 | VIDEO CALL |
| LOC. B | 132 | VOICE CALL |
| LOC. B | 132 | TEXT MESSAGE |
| LOC. B | 132 | VIDEO CALL |
| LOC. C | 133 | VOICE CALL |
| LOC. C | 133 | VIDEO CALL |
| LOC. D | 134 | VOICE CALL |
| LOC. D | 134 | TEXT MESSAGE |

| GEO LOC. | PSAP ID | MEDIA TYPE ACCEPTED |
|---|---|---|
| LOC. A | 131 | VOICE CALL |
| LOC. A | 131 | TEXT MESSAGE |
| LOC. A | 131 | VIDEO CALL |
| LOC. B | 132 | VOICE CALL |
| LOC. B | 132 | TEXT MESSAGE |
| LOC. B | 132 | VIDEO CALL |
| LOC. C | 133 | VOICE CALL |
| LOC. C | 133 | VIDEO CALL |
| LOC. D | 134 | VOICE CALL |
| LOC. D | 134 | TEXT MESSAGE |

DATA STRUCTURE 500

CORRELATING MEDIA TYPES OF EMERGENCY COMMUNICATION REQUESTS

TECHNICAL FIELD

Aspects of the disclosure are related to the field of communications, and in particular, correlating media types of emergency communication requests in wireless communication networks.

TECHNICAL BACKGROUND

Wireless communication systems typically include wireless access systems, with equipment such as wireless access nodes, which provide wireless access to communication services for user devices over wireless links. A typical wireless communication system includes systems to provide wireless access across a geographic region, with wireless coverage areas associated with individual wireless access nodes. The wireless access systems exchange user communications between wireless user devices and service providers for the communication services. Communication services typically include voice calls, data exchange, web pages, streaming media, or text messages, among other communication services, such as emergency communication services.

Emergency communication services can include 911 calls or other communication sessions used to connect user devices to emergency service providers, such as police, fire, or ambulance services. These communication sessions can include voice calls, video calls, multimedia calls, text messages, or other types of communication sessions with a media type. Emergency calls are typically routed to emergency service nodes, such as public-safety answering points (PSAPs), Next Generation 9-1-1 (NG9-1-1) handling nodes, or other emergency call processing nodes. However, the individual emergency service nodes associated with the emergency service providers do not always support every media type that user devices support. For example, a particular PSAP might support voice calls but might not support video calls or text messages. Difficulty can arise when user devices attempt to initiate communication sessions for emergency services with an unsupported media type.

OVERVIEW

Systems, methods, and software for correlating media types of emergency communication requests in wireless communication networks are provided herein. In one example, a method of operating a wireless communication system which routes communications between user devices and emergency service providers is provided. The method includes monitoring communication requests for emergency communication sessions between the user devices and service nodes of the emergency service providers to determine which media types of the communication requests are supported by the service nodes receiving the communication requests, identifying geographic locations of the user devices for the communication requests, identifying the service nodes receiving the communication requests, and creating a data structure correlating the geographic locations of the user devices and identifiers of the service nodes to the media types supported by the service nodes.

In another example, a wireless communication system which routes communications between user devices and emergency service providers is provided. The wireless communication system includes a control node configured to monitor communication requests for emergency communication sessions between the user devices and service nodes of the emergency service providers to determine which media types of the communication requests are supported by the service nodes receiving the communication requests. The control node is also configured to identify geographic locations of the user devices for the communication requests, and identify the service nodes receiving the communication requests. The wireless communication system also includes a data structure configured to correlate the geographic locations of the user devices and identifiers of the service nodes to the media types supported by the service nodes.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
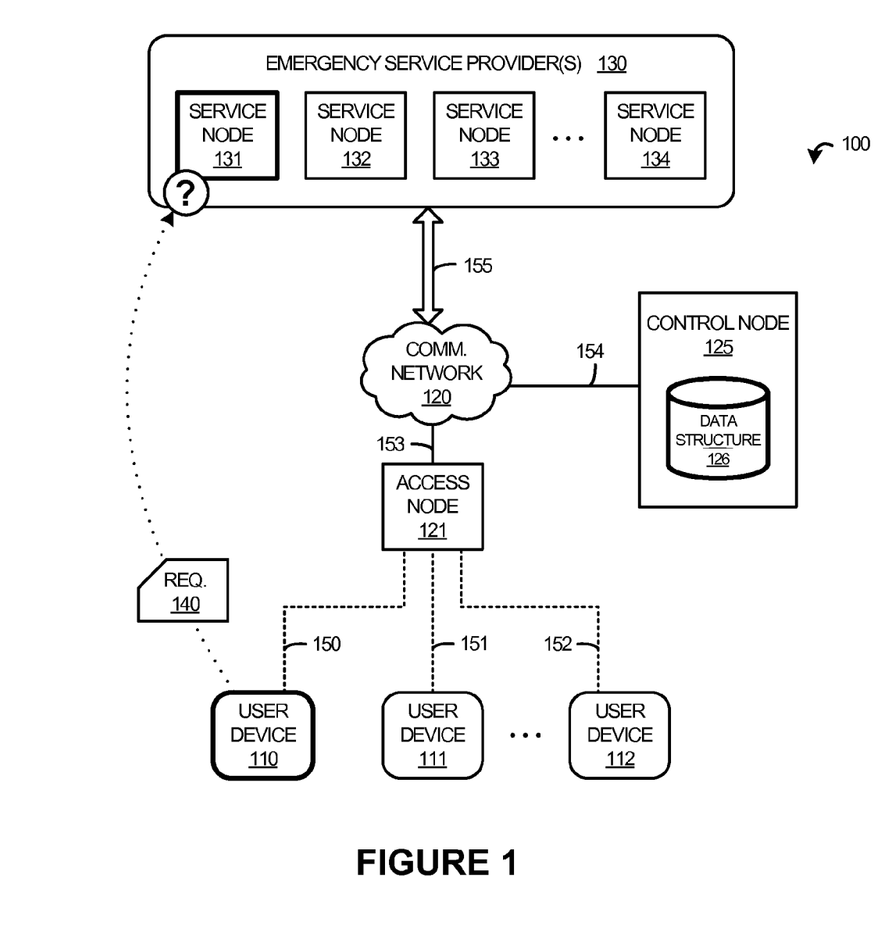
FIG. 1 is a system diagram illustrating a communication system.

FIG. 1 is a system diagram illustrating communication system 100. Communication system 100 includes user devices 110-112, communication network 120, access node 121, control node 125, and service nodes 131-134 of at least one emergency service provider 130. User devices 110-112 and access node 121 communicate over associated wireless links 150-152. Access node 121 and communication network 120 communicate over communication link 153. Communication network 120 and control node 125 communicate over communication link 154. Communication network 120 and service nodes 131-134 communicate over at least one communication link 155. Although one communication link 155 is shown for clarity in FIG. 1, it should be understood that individual links might instead be included between communication network 120 and each of service nodes 131-134. Also, service nodes 131-134 can be associated with one or more emergency service providers 130.

In operation, each of user devices 110-112 receive wireless access to communication services from access node 121 over associated wireless links 150-152. As a part of the wireless access, communication requests for emergency services can be issued by any of user devices 110-112. These communication requests for emergency services can be routed to ones of service nodes 131-134 for handling of emergency communication sessions. Emergency communication sessions can include 911 calls or other communication sessions used to connect user devices 110-112 to emergency service providers, such as police, fire, or ambulance services. These communication sessions can include voice calls, video calls, multimedia calls, text messages, or other types of communication sessions indicated by a media type.

Figure 2:
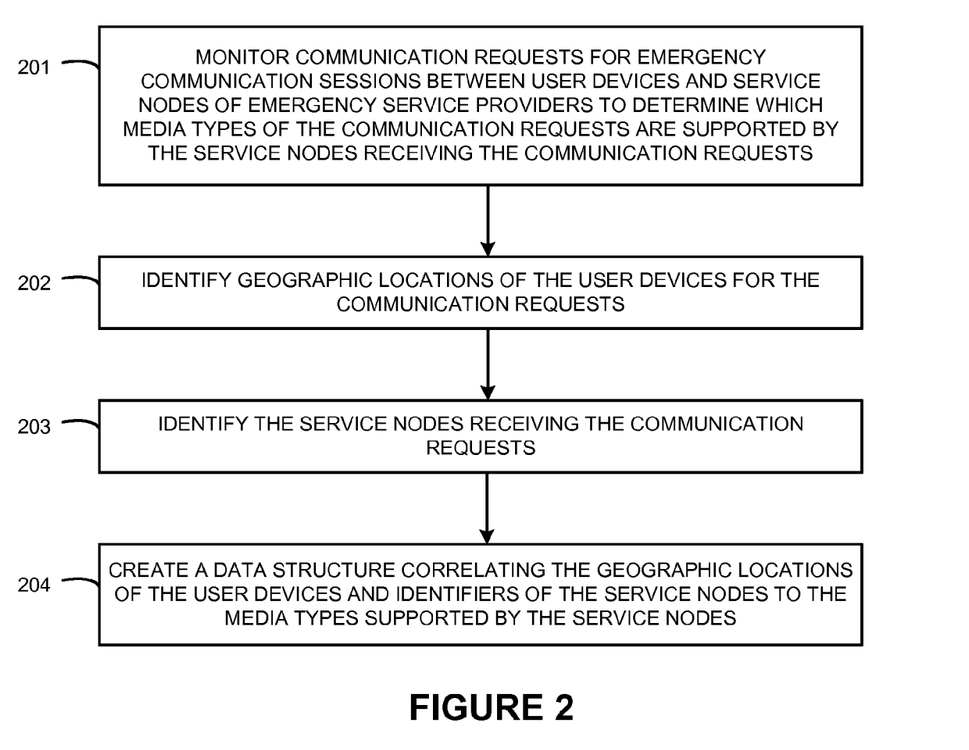
FIG. 2 is a flow diagram illustrating a method of operation of a communication system.

FIG. 2 is a flow diagram illustrating a method of operation of communication system 100. The operations of FIG. 2 are referenced parenthetically below. In FIG. 2, control node 125 monitors (201) communication requests for emergency communication sessions between user devices 110-112 and service nodes 131-134 of emergency service providers 130 to determine which media types of the communication requests are supported by service nodes 131-134 receiving the communication requests. The media types can include voice calls, video calls, multimedia calls, text messages, or other media types of communication sessions. In some examples, control node 125 identifies media types of the communication requests that are rejected or accepted by ones of service nodes 131-134 to determine which media types are supported. Request 140 represents an exemplary communication request initiated by user device 110, which in this example gets routed to service node 131.

Control node 125 identifies (202) geographic locations of user devices for the communication requests. The geographic locations can correspond to a physical location of user devices 110-112, such as geographic coordinates. The geographic locations can correspond to an identifier for a wireless access point, coverage area, or sector that individual ones of user devices 110-112 are associated with or receiving wireless access from, among other identifiers. The geographic locations can be received from user devices 110-112, determined by control node 125, or determined by other equipment associated with communication network 120.

Control node 125 identifies (203) service nodes receiving the communication requests. Service nodes 131-134 can be identified by a various identifiers, such as a numerical identifier, a network address, service node phone number, or other identifiers, including combinations thereof. The identity of service nodes 131-134 can be received from service nodes 131-134, determined by control node 125, received from user devices 110-112, or determined by other equipment associated with communication network 120.

Data structure 126 is created (204) by control node 125 correlating the geographic locations of user devices 110-112 and identifiers of service nodes 131-134 to the media types supported by service nodes 131-134. The data structure can include a database, table, spreadsheet, delimited list, or other data structure, including combinations thereof. The data structure relates an identifier of the geographic location, such as geographic coordinates, an access point identifier, a sector identifier, or the like, with the various media types. The data structure indicates whether various media types are supported by each of service nodes 131-134.

For example, an entry in the data structure can be created for service node 131 based on the media type of request 140 and whether the media type of request 140 is accepted or rejected by service node 131. This entry is also correlated to the geographic location of user device 110. In operation, service node 131 can accept or reject request 140 based in part on the media type of request 140. For example, if the media type of request 140 is not supported by service node 131, then service node 131 can reject request 140. Likewise, if the media type of request 140 is supported by service node 131, then service node 131 can accept request 140. An accept/reject indication can be transferred by service node 131 for delivery to user device 110. Control node 125 can monitor the communications associated with request 140 and the accept/reject indication, among other communications routed between user device 110 and service node 131. Although request 140 is discussed above, it should be understood that further communications can be handled accordingly between any of user devices 110-112 and service nodes 131-134.

Figure 3:
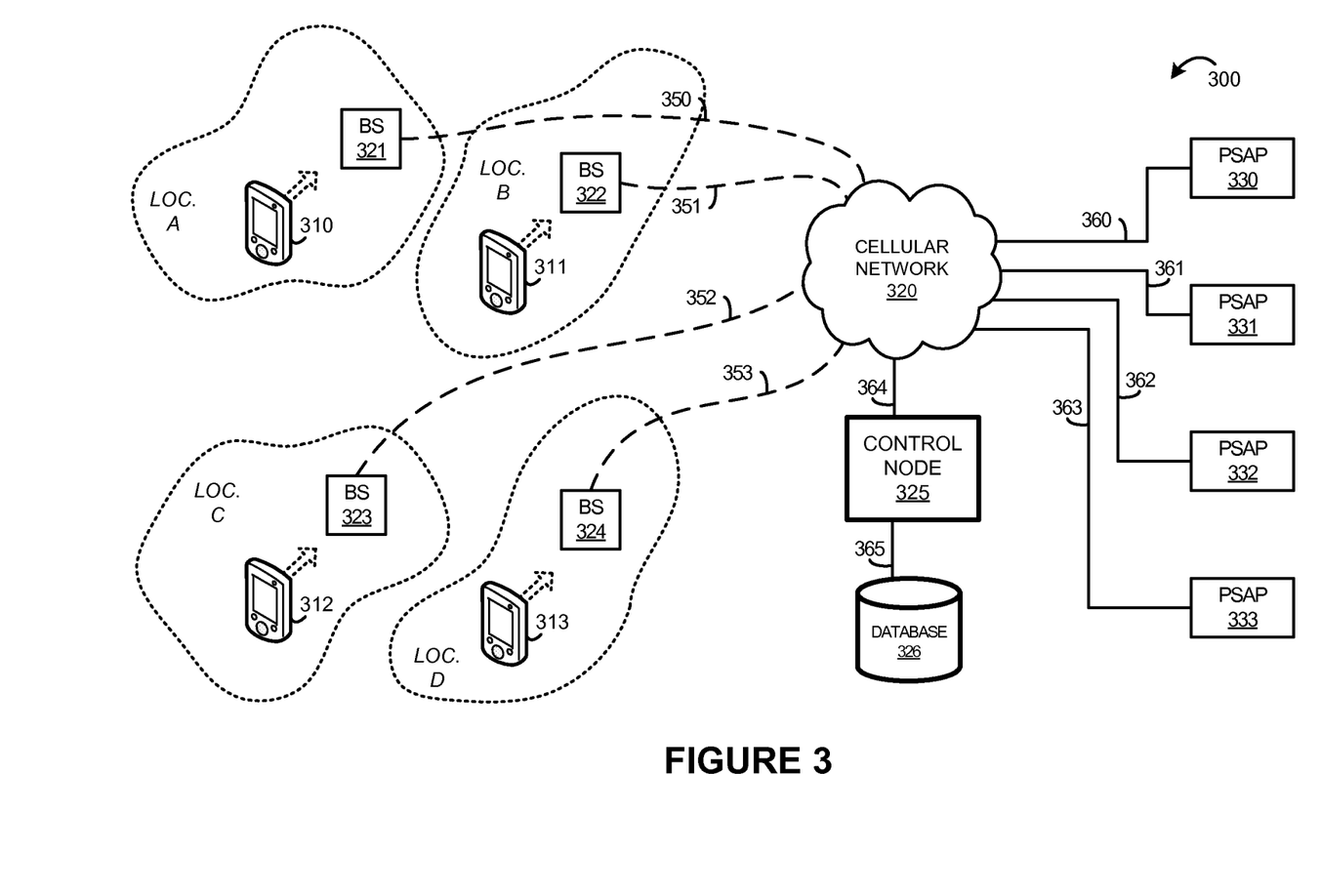
FIG. 3 is a system diagram illustrating a communication system.

FIG. 3 is a system diagram illustrating communication system 300. Communication system 300 includes smartphones 310-313 at associated geographic locations A-D, cellular network 320 which provides wireless access to communication services through base stations (BS) 321-324, control node 325, database 326, and public safety answering points (PSAPs) 330-333.

Smartphones 310-313 can be any mobile communication device or wireless communication device and communicate over wireless links (not shown for clarity) with associated ones of BS 321-324. BS 321-324 can each be any wireless access node or wireless access point, such as base station or eNodeB equipment, and communicate with cellular network 320 over associated ones of T1 backhaul links 350-353. Cellular network 320 includes equipment and systems of a cellular communication network, and can include equipment described for communication network 120. Control node 325 communicates with database 326 and cellular network 320 over associated ones of network links 364-365 which can include IP links or packet links. Each of PSAPs 330-333 communicates with cellular network 320 over associated ones of T1 communication links 360-363. Control node 325 can include call session control function (CSCF) equipment, session initiation protocol (SIP) routing equipment, or other computing systems. Database 326 can include computer-readable storage systems, such as one or more data servers. Variations on the elements of FIG. 3 are possible, and the elements of FIG. 3 are not limited to the descriptions above.

In operation, each of smartphones 310-313 receives wireless access to communication services from any of BS 321-324 at the respective locations A-D over associated wireless links. As a part of the wireless access, communication requests for emergency services can be transferred by any of smartphones 310-313. These communication requests for emergency services can be routed to ones of PSAPs 330-333 for handling of emergency communication sessions. Emergency communication sessions can include 9-1-1 calls or other communication sessions used to connect smartphones 310-313 to emergency service providers, such as police, fire, or ambulance services. These communication sessions can include voice calls, video calls, multimedia calls, text messages, or other types of communication sessions indicated by a media type.

Figure 5:
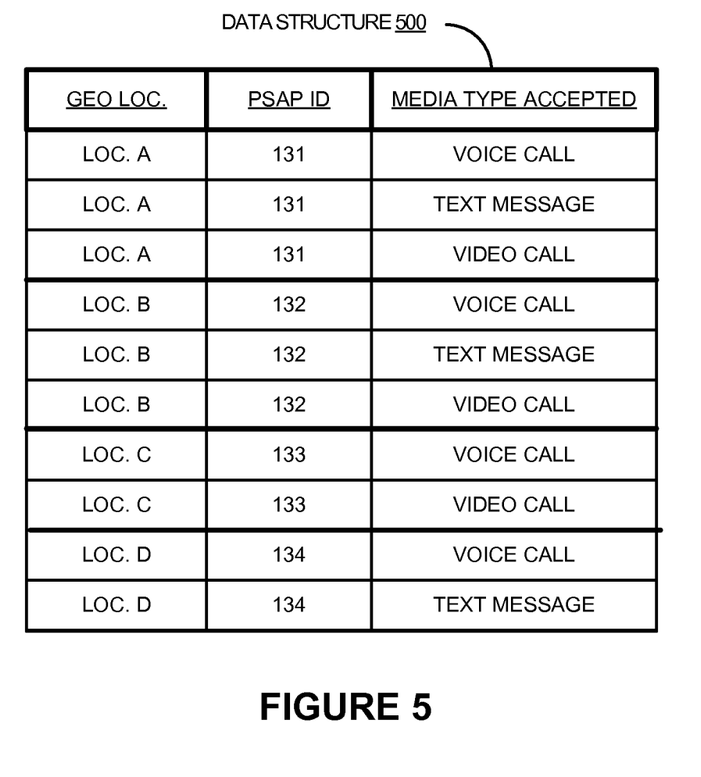
FIG. 5 is a table illustrating example media type correlations.

Also in FIG. 3, each PSAP is associated with a particular location, and provides emergency communication services for the associated location. FIG. 5 includes data structure 500 indicating various locations and PSAP associations in one example. FIG. 5 will be discussed below in more detail. However, for this example, PSAP 330 is associated with location A, PSAP 331 is associated with location B, PSAP 332 is associated with location C, and PSAP 333 is associated with location D, although other configurations are possible. When a smartphone or other end user device transfers an emergency communication request, the PSAP associated with the particular location of the smartphone receives the communication request by way of cellular network 320.

Figure 4:
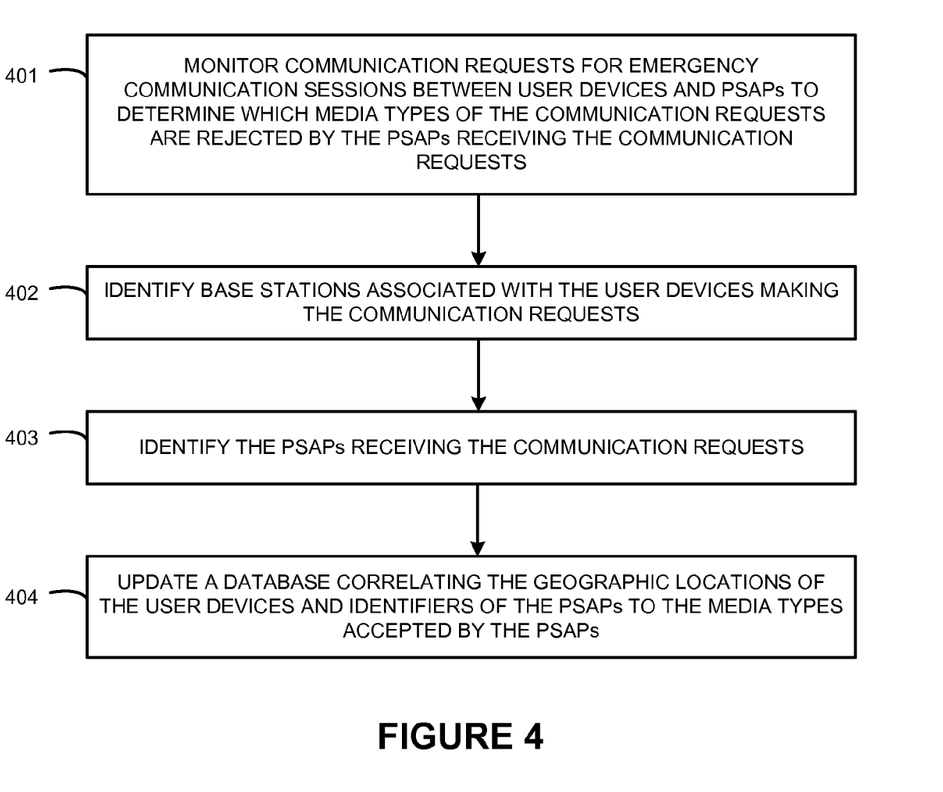
FIG. 4 is a flow diagram illustrating a method of operation of a communication system.

FIG. 4 is a flow diagram illustrating a method of operation of communication system 300. The operations of FIG. 4 are referenced parenthetically below. In FIG. 4, control node 325 monitors (401) communication requests for emergency communication sessions between user devices and PSAPs to determine which media types of the communication requests are rejected by the PSAPs receiving the communication requests. In this example, the user devices include smartphones 310-313, and the PSAPs include PSAPs 330-333.

The communication requests can include session initiation protocol (SIP) communication requests or messaging for establishing voice-over-packet communication sessions which can include various packet communications. The communication requests can include SIP INVITE messages directed to the PSAPs or an emergency service provider. It should be understood that other types of communication requests can be employed.

The monitoring of communication requests can be performed directly or indirectly by control node 325. For example, control node 325 can intercept traffic or monitor communications transferred between any of smartphones 310-313 and PSAPs 330-333 and determine when communication requests are transferred. In other examples, control node 325 is involved with routing the communication requests, such as in SIP messaging or voice-over-IP calls, and can monitor the communication requests associated therewith. In yet other examples, control node 325 can receive notification of the communication requests from equipment associated with cellular network 320.

Control node 325 identifies (402) base stations associated with the user devices making the communication requests. The base stations in this example can include ones of BS 321-324. The base stations can be identified by a base station identifier, node identifier, sector identifier, coverage area identifier, network logical address, and the like. The identifier of the base station can be received in the communication requests monitored by control node 325, or can be queried by control node 325 from the base stations themselves, or can be received from the base stations, among other identification pathways. Identifying the base stations can be an example of determining or identifying a physical location or geographic location of the user devices. Alternatively, geographic coordinates or a physical location of the user devices can be identified or received from the user devices and used to identify the base station.

Control node 325 identifies (403) the PSAPs receiving the communication requests. In FIG. 3, four PSAPs 330-333 are included, and thus the PSAPs identified will include ones of these PSAPs. In some examples, the PSAPs are identified based on the location where the communication request originates, such as a geographic location of a smartphone or a base station identifier. A data structure relating PSAPs to geographic location or base station can be referenced to identify the PSAPs receiving ones of the communication requests. For example, cellular network 320, or systems associated therewith, can identify which PSAP will receive a particular communication request based on a geographic location of a user device originating the communication request or based upon the base station through which the communication request originated, among other location associations. In some examples, the PSAP selected for a particular communication request might not be tied to a particular geographic location, or several PSAPs might be configured to service a particular geographic location or base station. Thus, further identification of the particular PSAP can be employed, such as determining which PSAP responds to the communication request by monitoring communications or packets exchanged between the selected PSAP and the originating user device.

Control node 325 updates (404) a database correlating the geographic locations of the user devices and identifiers of the PSAPs to the media types accepted by the PSAPs. In this example, control node 325 updates database 326. As discussed above, the geographic locations of the user devices includes the identities of the base stations associated with each of smartphones 310-313 where emergency communication requests are originated. Database 326 is updated, such as via record updating, table updating, and the like, to reflect an association between the base station and PSAP for each media type of the communication requests. As the communication requests are routed to the PSAPs, they can be accepted or rejected by the PSAPs based on at least the media type employed in the communication request or the media type requested in the communication requests. Database 326 is updated according to the acceptance or rejection of the media types.

As a further example of the correlations or associations between origination locations, PSAPs, and media types, table 500 of FIG. 5 can be referenced. Table 500 includes three columns, namely a first column for geographic location of communication request origination, a second column identifying the PSAP, and a third column identifying the media type accepted or supported for each combination of location and PSAP. As more locations, PSAPs, and media types are monitored by control node 325, further rows of table 500 can be created and maintained. Alternatively, table 500 can include entries for which media types are rejected or not supported by the PSAPs.

As seen in table 500, PSAP 131, which is associated with location A in this example, can accept voice calls, text messages, and video calls. PSAP 132, which is associated with location B in this example, can accept voice calls, text messages, and video calls. PSAP 133, which is associated with location C in this example, can accept voice calls and video calls, but not text messages. PSAP 134, which is associated with location D in this example, can accept voice calls and text messages, but not video calls. Over time, table 500 can be modified to include more or fewer locations, PSAPs, and media types, based on the communication requests monitored by control node 325.

In further examples, control node 325 or other equipment of cellular network 320 can compare new communication requests against database 326 to determine if media types of the new call requests are acceptable or not for the intended PSAPs before the communication requests or associated communication sessions are routed to the PSAPs. If the media type of a communication request is acceptable or supported, then the communication session can be allowed to proceed or be routed accordingly to the proper PSAP. If the media type of a communication request is not acceptable or not supported, such as by having a past rejection by the particular PSAP as indicated in database 326, then the communication session or communication request can be denied or halted before routing to the PSAP. This can speed up a communication request acceptance or rejection notification as systems in cellular network 320 can respond before the communication request is routed or handled by a PSAP. In addition, a communication request associated with an unacceptable media type can be responded to by systems of cellular network 320, such as control node 325, with a response message indicating the rejected media type. In further examples, the response message can include suggested or acceptable media types that the origination device can use in further attempts or communication requests.

In yet further examples, instead of a rejection of the communication request by system of cellular network 320, the media type of a rejected communication request can be altered by systems of cellular network 320 to an acceptable media type. Altering the media type can include extracting audio portions from a video call if only audio or voice calls are acceptable to a particular PSAP. In other examples, altering the media type can include creating a template or default video image to accompany an audio or voice call and transferring the communication request as a video call which includes the default video image along with the audio or voice portions. Other alterations can be employed, such as transcribing text messages from voice calls, or performing text-to-speech conversion on text messages for delivery to a PSAP as a voice call.

Figure 6:
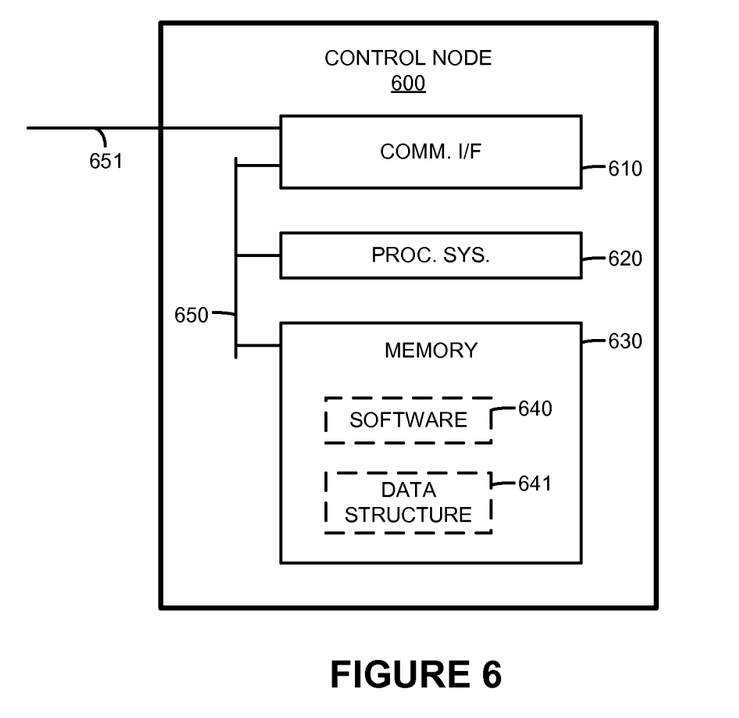
FIG. 6 is a block diagram illustrating a control node.

FIG. 6 is a block diagram illustrating a detailed view of control node 600. Control node 600 can include equipment and systems as discussed herein for control node 125 in FIG. 1, or control node 325 and database 326 of FIG. 3, although variations are possible. Control node 600 includes communication interface 610, processing system 620, and memory 630. In operation, processing system 620 is operatively linked to communication interface 610 and memory 630 by bus 650. It should be understood that discrete links can be employed, such as network links or other circuitry. Control node 600 can be distributed or consolidated among equipment or circuitry that together forms the elements of control node 600.

Processing system 620 is capable of executing software stored in memory 630. When executing the software, processing system 620 drives control node 600 to operate as described herein. Processing system 620 can be implemented within a single processing device but can also be distributed across multiple processing devices or sub-systems that cooperate in executing program instructions. Examples of processing system 620 include general purpose central processing units, microprocessors, application specific processors, and logic devices, as well as any other type of processing device.

Communication interface 610 includes a network interface for communicating with communication networks, such as communication network 120 of FIG. 1 or cellular network 320 of FIG. 3. The network interface can include a local or wide area network communication interface which can communicate over an Ethernet or Internet protocol (IP) link. Examples of communication interface 326 include network interface card equipment, transceivers, modems, and other communication circuitry. In this example, communication interface 610 communicates over link 651. Link 651 can include any communication link as described herein, such as that described for links 150-155 in FIG. 1.

Memory 630 can comprise any storage media readable by processing system 620 and capable of storing software 640 and data structure 641. Memory 630 can include volatile and nonvolatile, removable and non-removable media implemented in any method or technology for storage of information, such as computer readable instructions, data structures, program modules, or other data. Memory 630 can be implemented as a single storage device but can also be implemented across multiple storage devices or sub-systems. Memory 630 can comprise additional elements, such as a controller, capable of communicating with processing system 620. Examples of storage media include random access memory, read only memory, and flash memory, as well as any combination or variation thereof, or any other type of storage media. In some implementations, the storage media can be a non-transitory storage media. In some implementations, at least a portion of the storage media can be transitory. It should be understood that in no case is the storage media a propagated signal.

Software 640 stored on or in memory 630 can comprise computer program instructions, firmware, or some other form of machine-readable processing instructions having processes that when executed by processing system 620 direct control node 600 to operate as described herein. For example, software 640 drives control node 600 to monitor communication requests of user devices, identify locations of user devices, identify supported media types among service nodes of emergency service providers, and create data structure 641 relating various data, among other operations. Software 640 can also include user software applications. Software 640 can be implemented as a single application or as multiple applications. In general, software 640 can, when loaded into processing system 420 and executed, transform processing system 420 from a general-purpose device into a special-purpose device customized as described herein.

Data structure 641 can include various data structures, including databases, tables, spreadsheets, delimited lists, or other data structures, including combinations thereof. Data structure 641 relates at least an identifier of a geographic location to various media types supported for service nodes of emergency service providers.

Control node 600 can also include other elements, such as user interfaces, computer systems, databases, distributed storage and processing elements, and the like. Control node 600 can be included in the equipment or systems of communication network 120 of FIG. 1 or cellular network 320 of FIG. 3, or can be included in separate equipment or systems, including combinations thereof.

Referring back to FIG. 1, user devices 110-112 each comprise one or more transceiver circuitry elements and communication elements. The transceiver circuitry typically includes amplifiers, filters, modulators, and signal processing circuitry. User devices 110-112 can also each include user interface systems, memory devices, non-transitory computer-readable storage mediums, software, processing circuitry, or some other communication components. User devices 110-112 can each be a user device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Access node 121 is associated with communication network 120, and provides wireless links for wireless access to the communication services of communication network 120. Access node 121 comprises RF communication and control circuitry, transceivers, and antennas, as well as wireless communications equipment capable of communicating with and providing wireless access within a wireless coverage area to communication services for wireless communication devices, such as user devices 110-112. The RF communication circuitry typically includes amplifiers, filters, RF modulators, transceivers, and signal processing circuitry. Access node 121 can also comprise elements such as base stations, base transceiver stations (BTS), E-UTRAN Node B equipment, eNodeB equipment, Evolved Node B equipment, Evolved Universal Terrestrial Radio Access (E-UTRA) network equipment. In the example shown in FIG. 1, access node 121 includes equipment to provide wireless access over more than one wireless frequency spectrum, which can include on or more transceivers, antennas, processing systems, or other equipment.

Communication network 120 comprises communication and control systems for providing access to communication services for user devices. Communication network 120 can provide communication services including voice calls, text messages, data access, or other communication services provided over a cellular or wireless communication network. In some examples, wireless communication network 120 includes equipment to provide wireless access to communication services within different coverage areas to user devices, route communications between content providers and user devices, and facilitate handoffs between equipment of different coverage areas, among other operations. Communication network 120 can also comprise elements such as E-UTRAN Node B equipment, eNodeB equipment, Evolved Node B equipment, Mobility Management Entity (MME) equipment, Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Control node 125 comprises systems and equipment for monitoring communication requests of user devices, identifying locations of user devices, identifying supported media types among service nodes of emergency service providers, and creating a data structure relating various data, among other operations. Control node 125 can include communication or network interfaces, as well as computer systems, microprocessors, circuitry, or some other processing devices or software systems, and can be distributed among multiple processing devices. Examples of control node 125 can also include software such as an operating system, logs, databases, utilities, drivers, networking software, and other software stored on a computer-readable medium. Control node 125 can also include Call Session Control Function (CSCF) equipment, session initiation protocol (SIP) proxy systems, SIP routing systems, SIP monitoring systems, mobile switching centers (MSC), cloud-based systems, database systems, or other systems.

Service nodes 131-134 each comprise emergency service communication systems, such as public-safety answering points (PSAPs), Next Generation 9-1-1 (NG9-1-1) handling nodes, telecommunications equipment, computing systems, multimedia systems, or other emergency call center equipment for receiving and handling emergency communication requests initiated by end users.

Communication links 153-155 each use metal, glass, optical, air, space, or some other material as the transport media. Communication links 153-155 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 153-155 can each be a direct link or can include intermediate networks, systems, or devices, and can include a logical network link transported over multiple physical links.

Wireless links 150-152 can each use the air or space as the transport media. Wireless link 150-152 each comprises a wireless communication link provided over an associated wireless frequency spectrum or wireless frequency band, and can use various protocols, such as Long Term Evolution (LTE), LTE Advanced, Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main wireless link for each of wireless links 150-152 is shown in FIG. 1, it should be understood that wireless links 150-152 are merely illustrative to show communication modes or wireless access pathways for user devices 110-112. In other examples, further wireless links can be shown, with portions of the further wireless links shared and used for different communication sessions or different content types, among other configurations.

Communication links 150-155 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system which routes communications between user devices and emergency service providers, the method comprising:
   monitoring communication requests for emergency communication sessions between the user devices and service nodes of the emergency service providers to determine which media types of the communication requests are supported by the service nodes receiving the communication requests;
   identifying geographic locations of the user devices for the communication requests;
   identifying the service nodes receiving the communication requests;
   creating a data structure correlating the geographic locations of the user devices and identifiers of the service nodes to the media types supported by the service nodes;
   receiving communication requests from further user devices for emergency communication sessions;
   processing at least geographic locations of the further user devices and media types of the communication requests against the data structure to determine which of the media types are supported by the geographic locations of the further user devices; and
   indicating to the further user devices which of the media types are supported for associated ones of the communication requests.

2. The method of claim 1, wherein the communication requests comprise session initiation protocol (SIP) INVITE messages directed to the service nodes of the emergency service providers.

3. The method of claim 1, wherein identifying the geographic locations of the user devices for the communication requests comprises determining wireless access node identifiers for wireless access nodes providing wireless access to the user devices.

4. The method of claim 1, wherein identifying the geographic locations of the user devices for the communication requests comprises determining geographic coordinates of the user devices.

5. The method of claim 1, wherein the media types comprise ones of voice calls, video calls, and text messages.

6. The method of claim 1, wherein the service nodes comprise public-safety answering points (PSAPs).

7. The method of claim 1, wherein the data structure comprises a database configured to correlate the geographic locations of the user devices and identifiers of the service nodes to the media types supported by the service nodes.

8. The method of claim 1, further comprising:
receiving a first communication request for a first emergency communication session from a first of the further user devices;
processing at least a first geographic location of the first of the further user devices and a first media type of the first communication request against the data structure to determine when a first service node associated with the first geographic location supports the first media type.

9. The method of claim 8, further comprising:
when the data structure indicates the first media type of the first communication request is not supported by the service node, then providing a notification to the first of the further user devices indicating at least a suggestion of a second media type for the first emergency communication session.

10. The method of claim 8, further comprising:
when the data structure indicates the first media type of the first communication request is supported by the service node, then establishing the first emergency communication session between the first of the further user devices and the first service node.

11. A wireless communication system which routes communications between user devices and emergency service providers, comprising:
a control node configured to monitor communication requests for emergency communication sessions between the user devices and service nodes of the emergency service providers to determine which media types of the communication requests are supported by the service nodes receiving the communication requests;
the control node configured to identify geographic locations of the user devices for the communication requests;
the control node configured to identify the service nodes receiving the communication requests;
a data structure configured to correlate the geographic locations of the user devices and identifiers of the service nodes to the media types supported by the service nodes;
the control node configured to monitor communication requests from further user devices for emergency communication sessions;
the control node configured to process at least geographic locations of the further user devices and media types of the communication requests against the data structure to determine which of the media types are supported by the geographic locations of the further user devices; and
the control node configured to indicate to the further user devices which of the media types are supported for associated ones of the communication requests.

12. The wireless communication system of claim 11, wherein the communication requests comprise session initiation protocol (SIP) INVITE messages directed to the service nodes of the emergency service providers.

13. The wireless communication system of claim 11, comprising:
the control node configured to identify wireless access node identifiers for wireless access nodes providing wireless access to the user devices to identify the geographic locations of the user devices for the communication requests.

14. The wireless communication system of claim 11, comprising:
the control node configured to identify geographic coordinates of the user devices to identify the geographic locations of the user devices for the communication requests.

15. The wireless communication system of claim 11, wherein the media types comprise ones of voice calls, video calls, and text messages.

16. The wireless communication system of claim 11, wherein the service nodes comprise public-safety answering points (PSAPs).

17. The wireless communication system of claim 11, wherein the data structure comprises a database node configured to correlate the geographic locations of the user devices and identifiers of the service nodes to the media types supported by the service nodes.

18. The wireless communication system of claim 11, comprising:
a wireless access node configured to receive a first communication request for a first emergency communication session from a first of the further user devices;
the control node configured to process at least a first geographic location of the first of the further user devices and a first media type of the first communication request against the data structure to determine when a first service node associated with the first geographic location supports the first media type.

19. The wireless communication system of claim 18, comprising:
when the data structure indicates the first media type of the first communication request is not supported by the service node, then the control node is configured to provide a notification to the first of the further user devices indicating at least a suggestion of a second media type for the first emergency communication session.

20. The wireless communication system of claim 18, comprising:
when the data structure indicates the first media type of the first communication request is supported by the service node, then the wireless access node is configured to establish the first emergency communication session between the first of the further user devices and the first service node.

* * * * *